United States Patent
Silva et al.

(10) Patent No.: US 7,539,832 B2
(45) Date of Patent: May 26, 2009

(54) OPTION ROM CODE ACQUISITION

(75) Inventors: Stephen Silva, Fort Collins, CO (US); John A. Morrison, Fort Collins, CO (US); Michael S. Allison, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 443 days.

(21) Appl. No.: 10/923,905

(22) Filed: Aug. 23, 2004

(65) Prior Publication Data

US 2006/0041710 A1    Feb. 23, 2006

(51) Int. Cl.
*G06F 12/00* (2006.01)

(52) U.S. Cl. .......................... 711/170; 710/8; 710/104; 713/2

(58) Field of Classification Search .................. None
See application file for complete search history.

(56) References Cited

U.S. PATENT DOCUMENTS

| | | | | |
|---|---|---|---|---|
| 5,953,746 | A * | 9/1999 | Crocker et al. | 711/173 |
| 6,247,079 | B1 * | 6/2001 | Papa et al. | 710/302 |
| 6,314,501 | B1 * | 11/2001 | Gulick et al. | 711/153 |
| 6,314,525 | B1 * | 11/2001 | Mahalingham et al. | 714/4 |
| 6,418,492 | B1 * | 7/2002 | Papa et al. | 710/302 |
| 6,539,476 | B1 * | 3/2003 | Marianetti et al. | 713/100 |
| 7,007,159 | B2 * | 2/2006 | Wyatt | 713/1 |
| 2003/0005070 | A1 * | 1/2003 | Narasimhamurthy et al. | 709/213 |
| 2003/0037178 | A1 * | 2/2003 | Vessey et al. | 709/319 |
| 2003/0217255 | A1 * | 11/2003 | Wyatt | 713/100 |
| 2004/0267708 | A1 * | 12/2004 | Rothman et al. | 707/3 |
| 2004/0268113 | A1 * | 12/2004 | Rothman et al. | 713/2 |
| 2005/0038981 | A1 * | 2/2005 | Connor et al. | 713/1 |
| 2005/0097384 | A1 * | 5/2005 | Uehara et al. | 714/1 |

* cited by examiner

*Primary Examiner*—Matt Kim
*Assistant Examiner*—Ryan Dare (57) ABSTRACT

Systems, methodologies, media, and other embodiments associated with acquiring processor executable instructions from an option ROM are described. One exemplary method embodiment includes discovering input/output devices operably connected to a processor and updating a data structure with information concerning the input/output devices. The example method embodiment may also include obtaining a device driver from an option ROM associated with an input/output device, storing the device driver in non-MMIO memory and making the device driver available to input/output devices physically connected to the processor and for which information is stored in the data structure.

24 Claims, 7 Drawing Sheets

OPTION ROM CODE ACQUISITION

BACKGROUND

Computing systems (e.g., personal computers, servers) have conventionally included components like a central processing unit(s) (CPU), a ROM BIOS (read only memory basic input output system), different types of memory, input/output (I/O) devices, storage devices, and so on. The CPU, memories, devices, and so on, have typically been logically and physically connected by a bus. These conventional systems may not have been configured identically and may have included expansion slots that facilitated connecting other components like additional memory, additional I/O devices, specialized processors (e.g., graphics coprocessors), and the like.

To facilitate handling various configurations and/or the addition/removal of components, conventional systems may have included a base system that engaged in a startup procedure known as a boot sequence. The boot sequence may have included a discovery phase for discovering, for example, what devices were connected to the base system. Building a base system that included software (e.g., device drivers) to interact with every possible known device would have been unwieldy. Additionally, a base system built before a new technology came into existence could not possibly have included software configured to interact with devices built from the new technology. Thus, to facilitate dynamically configuring systems and to allow for the use of future technologies, some base systems were produced that were designed to interact with devices that provided their own device driver to the base system. Devices built to interact with such base systems may have included an option ROM that stored a device driver for the device. Thus, if the boot process for the base system was configured to find, load, and use a device driver provided in an option ROM, associating a device (even an after-invented device), with a base system was relatively straightforward.

By way of illustration, as a boot sequence discovered a device the boot sequence could load processor executable instructions like a device driver from an option ROM on the device. In one example, the base system boot sequence could load a device driver from an option ROM on a device into memory mapped I/O (MMIO) memory associated with the base system. Then, the base system boot sequence could execute the loaded device driver from that MMIO memory. However, MMIO memory is a finite and precious resource. Thus, as computing systems grow to include increasing numbers of devices organized into deeper hierarchical levels that communicate across ever-increasing numbers and types of busses, loading option ROM based device drivers into MMIO memory space may become undesirable.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. It will be appreciated that one element may be designed as multiple elements or that multiple elements may be designed as one element. An element shown as an internal component of another element may be implemented as an external component and vice versa. Furthermore, elements may not be drawn to scale.

DETAILED DESCRIPTION

Example systems and methods described herein facilitate acquiring processor executable instructions like a device driver from an option ROM on an I/O device that is operably connected to a system. The system may run a boot sequence that includes discovering devices (e.g., I/O devices) that are operably connected to the system, logically representing the discovered devices in a data structure (e.g., system tree, array, linked list, database), reading device drivers from option ROMs associated with the discovered I/O devices, storing the device drivers in non-MMIO memory, and making the device drivers stored in non-MMIO memory available to devices in the data structure. Thus, MMIO memory is not consumed by option ROM device drivers. Furthermore, I/O devices that may not have had a device driver available from an option ROM may benefit from a similar I/O device providing a device driver. Additionally, MMIO memory may be more intelligently allocated based on information gathered during the discovery phase. In one example, even after MMIO memory has been allocated to I/O devices discovered using the above-described method, additional I/O devices with additional option ROMs storing additional device drivers may be added to the data structure. Thus, computing systems (e.g., cellular architectures) that have a large number of I/O devices that communicate over, for example, a large number and variety of busses may interact with legacy I/O devices that provide device drivers via an option ROM.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "component" refers to a computer-related hardware entity. For example, a computer component can be, but is not limited to being, an input/output device, a processor, a disk, a memory, and so on.

"Computer-readable medium", as used herein, refers to a medium that participates in directly or indirectly providing signals, instructions and/or data. A computer-readable medium may take forms, including, but not limited to, non-volatile media, volatile media, and so on. Non-volatile media may include, for example, optical or magnetic disks, and so on. Volatile media may include, for example, optical or magnetic disks, dynamic memory and so on. Common forms of a computer-readable medium include, but are not limited to, a disk, a tape, other magnetic media, a CD-ROM, other optical media, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection. As used herein, when two entities (e.g., I/O device, processor) are operably connected, they may be considered to be part of a larger system that includes the two entities.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. It will be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be produced using various programming languages and tools. Software, whether an entire system or a component of a system, may be embodied as an article of manufacture and maintained or provided as part of a computer-readable medium as defined previously.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Figure 1:
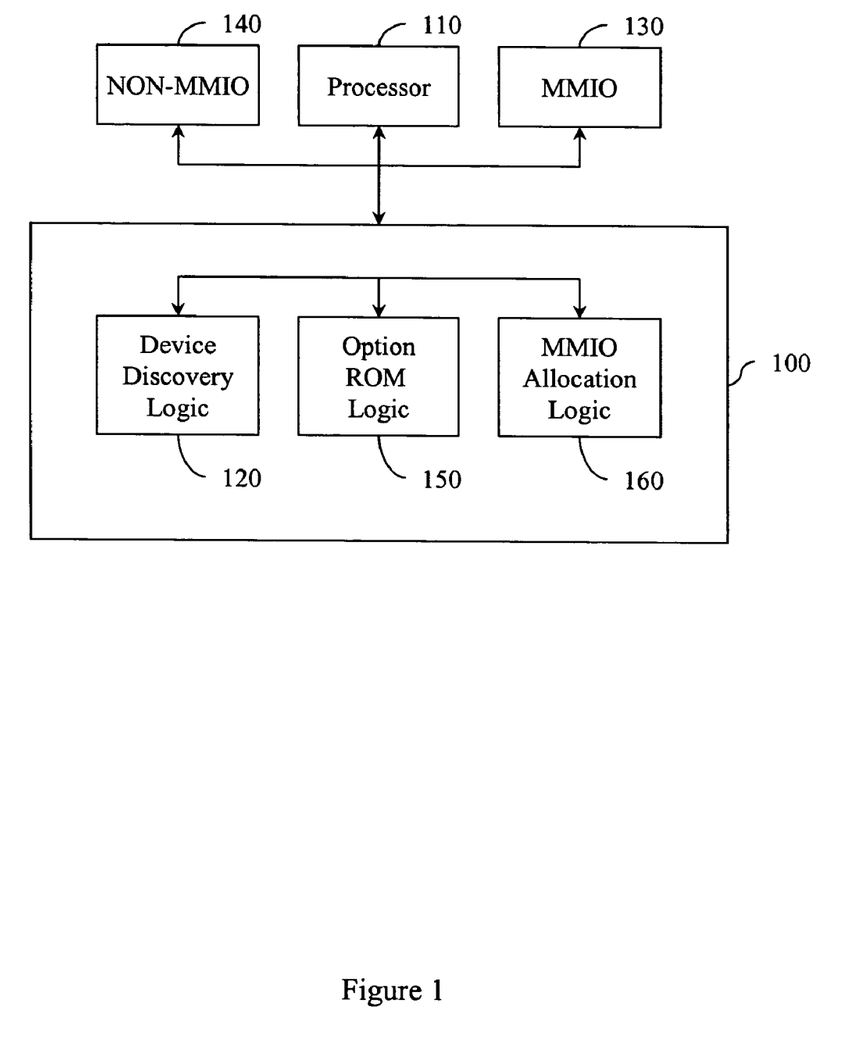
FIG. 1 illustrates an example system for acquiring processor executable instructions from an option ROM.

FIG. 1 illustrates an example system 100 that is configured to acquire processor executable instructions (e.g., device driver) from an option ROM associated with (e.g., located on) a device like an I/O device that is operably connected to a processor 110. In one example, the processor 110 may be part of a system associated with a large number of I/O devices. For example, in a cellular architecture, processor 110 may interact with dozens, hundreds, potentially thousands of I/O devices. While a cellular architecture is described, it is to be appreciated that other architectures may also include multiple I/O devices communicating across a number and variety of busses and/or other connections with processor 110. Furthermore, while a single processor 110 is illustrated, it is to be appreciated that processor 110 may represent a multi-processing system.

The system 100 may include, for example, a device discovery logic 120 that is configured to discover devices operably connected to the processor 110 and functioning as part of a system that includes processor 110. The processor 110 may have available, for example, a finite amount of memory mapped input/output (MMIO) memory 130 for interacting with I/O devices. Thus, conventional wholesale consumption of MMIO memory 130 by device drivers in option ROMs on I/O devices may be undesirable. In addition to MMIO memory 130, the processor 110 may also have available a finite amount of non-MMIO memory 140. Many systems tend to have substantially more non-MMIO memory 140 than MMIO memory 130, (e.g., 16 Mb non-MMIO memory 140, 128 Kb MMIO memory 130). Thus, example system 100 may facilitate storing device drivers acquired from option ROMs in I/O devices in non-MMIO memory 140 rather than in MMIO memory 130.

In one example, the device discovery logic 120 may be configured to manipulate a system tree (not illustrated) that stores data concerning devices discovered by the device discovery logic 120. For example, as the device discovery logic 120 locates I/O devices configured as part of the system including processor 110, it may add entries to a system tree that is available to processor 110. The system tree may be employed to track the hierarchy of devices operably connected to the processor 110. After storing information about a discovered device in the system tree, the device discovery logic 120 may link the processor executable instruction(s) (e.g., device driver) stored in the non-MMIO memory 140 to devices for which data is recorded in the system tree. Thus, a device driver acquired from a first I/O device may be available to other similar I/O devices that are operably connected to the processor 110 but which may not have provided a device driver.

The system 100 may also include an option ROM logic 150 that is configured to read a processor executable instruction from an option ROM associated with a device discovered by the device discovery logic 120. In one example, the processor executable instruction(s) may be a device driver that facilitates interactions between an I/O device and the processor 110. As described above, having I/O devices supply their device drivers via an option ROM facilitates having base systems that can be configured with various I/O devices, even after-invented devices. The option ROM logic 150 may also be configured to store the processor executable instruction(s) in non-MMIO memory 140. Thus, rather than a device driver being stored in the smaller MMIO memory 130, the system 100 facilitates storing device drivers acquired from I/O devices in the typically relatively larger non-MMIO 140.

System 100 may also include an MMIO allocation logic 160 that is operably connected to the processor 110. The MMIO allocation logic 160 may be configured to determine an MMIO memory requirement for devices discovered by the device discovery logic 120 and to selectively allocate memory from MMIO memory 130 to the devices.

In one example, system 100 may be configured to interact with devices that can be "hot-swapped" in and/or out of a configuration that includes processor 110. Thus, at one point in time processor 110 may be associated with a first set of I/O devices, but at another point in time processor 110 may be associated with a second set of I/O devices. Thus, in one example, the device discovery logic 120 may be configured to identify an unused physical location where a device could be operably connected to processor 110 and to reserve a predetermined amount of MMIO memory 130 for a device that may be later associated with the unused physical location. The device discovery logic 120 may also be configured to determine that a newly discovered device that includes an option ROM has been associated with the unused physical location. Thus, after allocating memory from MMIO memory 130 to devices found in the first set, the device discovery logic 120 may be configured to update the system tree with data concerning the newly discovered device. Furthermore, the device discovery logic 120 may be configured to acquire a device driver from the newly discovered device and to store the device driver in non-MMIO memory 140. Having stored the device driver for the newly discovered device in non-MMIO memory 140 and having updated the system tree to reflect the change in the hierarchy of I/O devices, the device discovery logic 120 may make the device driver from the newly discovered device that is stored in non-MMIO memory 140 available to devices for which data is recorded in the system tree.

Hot-swapping may involve adding an I/O device as described above. Furthermore, hot-swapping may also involve removing an I/O device and replacing it with a different I/O device. The different I/O device may have different MMIO requirements, aperture size preferences, and so on. Furthermore, the different I/O device may have its own device driver available on its own option ROM. Thus, in one example, the device discovery logic 120 may be configured to determine that a first device for which data is recorded in the system tree has been replaced with a second device that includes an option ROM. After determining that the first device has been replaced by a second device that includes an option ROM, the device discovery logic 120 may open an MMIO aperture to a size that is less than or equal to the amount of MMIO memory 130 that was previously allocated to the first device. Then, the device discovery logic 120 may read a device driver for the second device from the option ROM on the second device. Having read the device driver for the second device, the device discovery logic 120 may then store the device driver for the second device in non-MMIO memory 140. Thus, valuable and limited MMIO memory 130 will not be unnecessarily consumed. The device discovery logic 120 may then close the MMIO aperture and link the device driver for the second device stored in non-MMIO memory 140 to one or more devices for which data is recorded in the system tree. Thus, a device driver that was not previously available to devices similar to the second device may become available to such devices without reconfiguring the physical devices.

Figure 2:
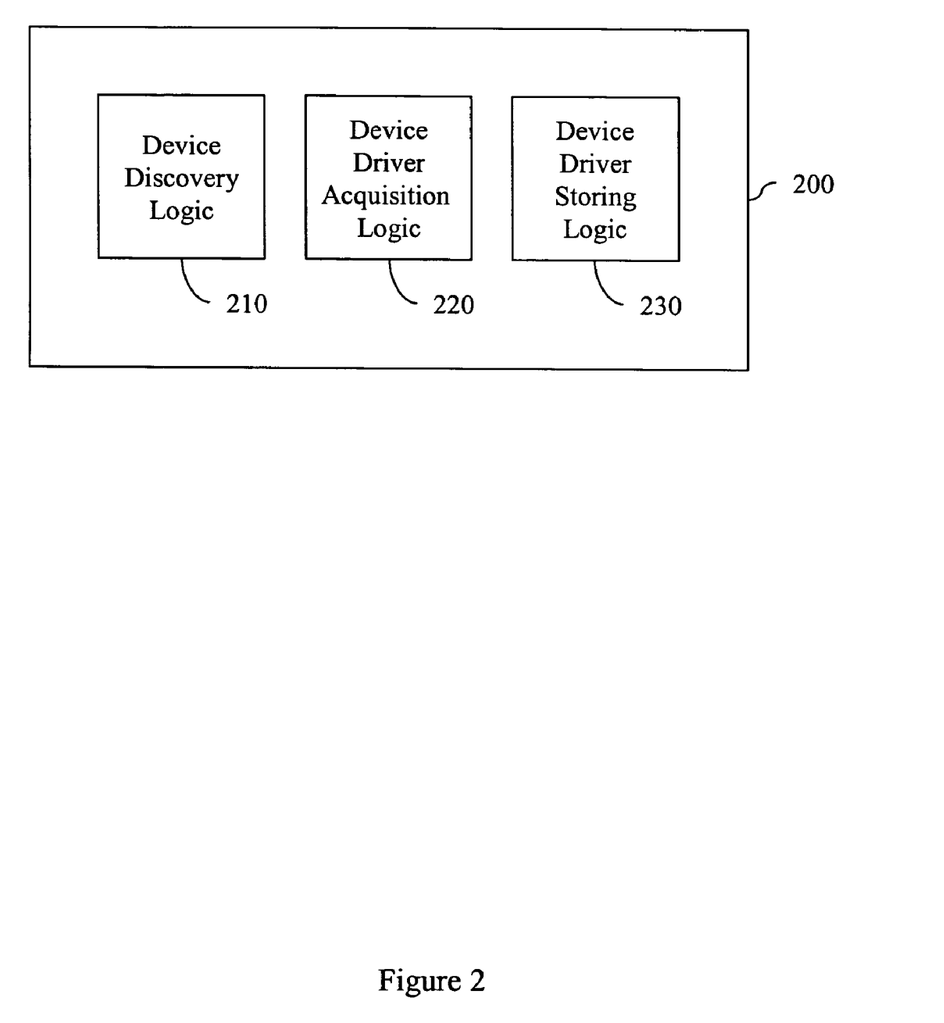
FIG. 2 illustrates an example system for acquiring a device driver from an option ROM and storing the device driver in non-MMIO memory.

FIG. 2 illustrates an example system 200 that is configured to acquire a device driver from an option ROM and to store the device driver in non-MMIO memory. The system 200 includes a device discovery logic 210 that is configured to discover an input/output device that is physically connected to a processor for which the device discovery logic 210 is performing system discovery. The system discovery may be performed as part of a boot sequence, for example. The device discovery logic 210 may also be configured to update a system tree with information concerning discovered input/output devices.

System 200 may also include a device driver acquisition logic 220 that is configured to acquire a device driver for an I/O device from an option ROM associated with the input/output device. In one example, the device driver acquisition logic 220 may be a pull model logic that controls reading the device driver from the I/O device. In another example, the device driver acquisition logic 220 may be a push model logic that receives the device driver from the I/O device.

System 200 may also include a device driver storing logic 230 that is configured to store the device driver acquired from the I/O device into non-MMIO memory available to the processor. The device driver storing logic 230 may also be configured to facilitate making the device driver stored in non-MMIO memory available to other input/output devices discovered by the device discovery logic 210.

Figure 3:
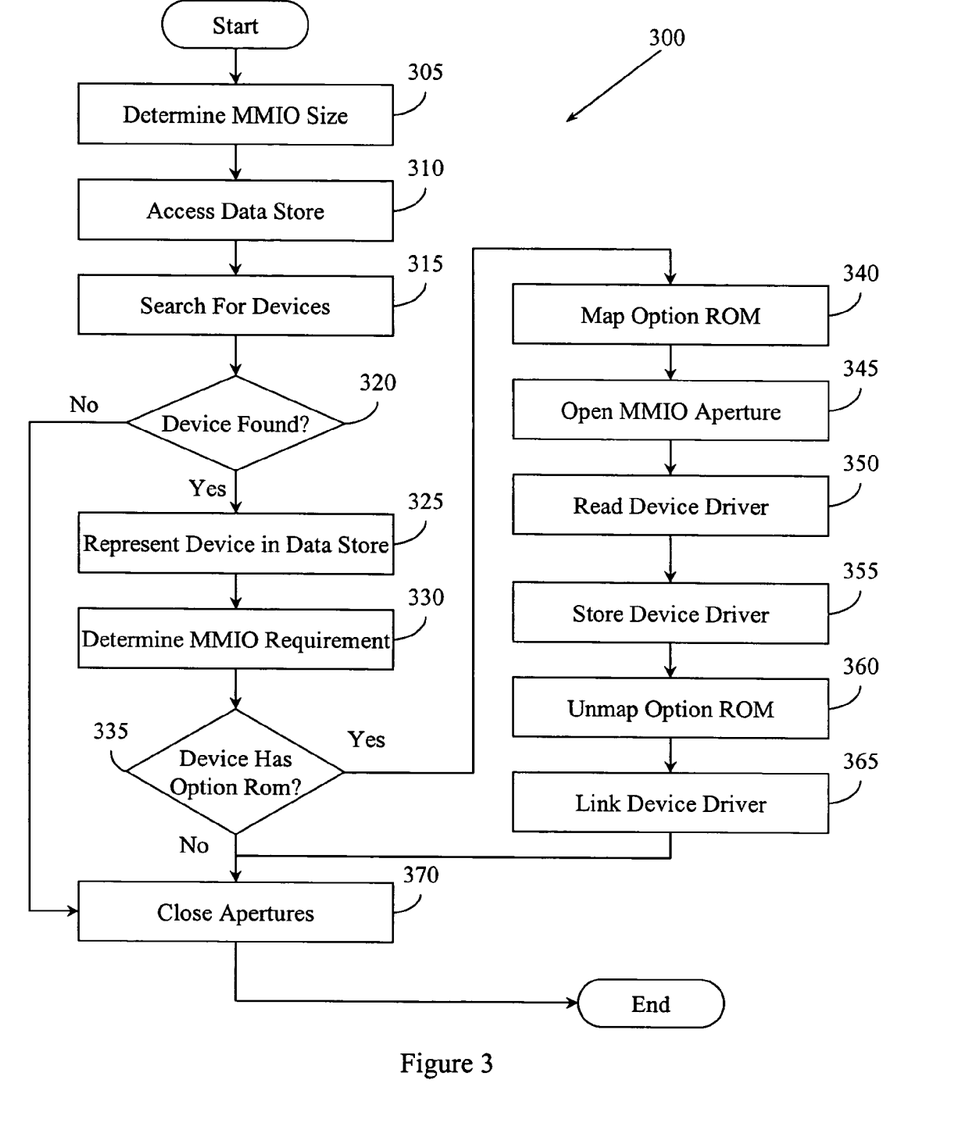
FIG. 3 illustrates an example method for acquiring a device driver from an option ROM and storing the device driver in non-MMIO memory.
Figure 4:
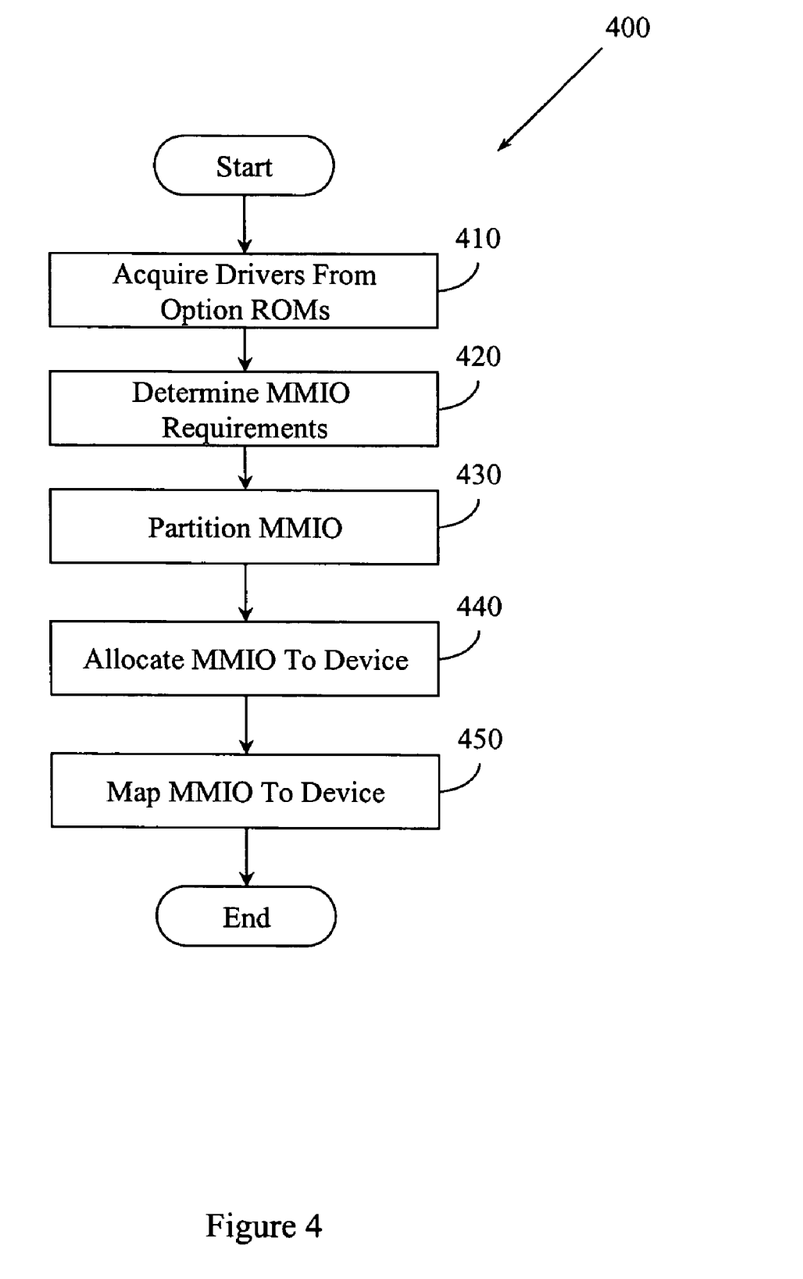
FIG. 4 illustrates an example method associated with acquiring a device driver from an option ROM, storing the device driver in non-MMIO memory, and intelligently allocating MMIO memory.
Figure 5:
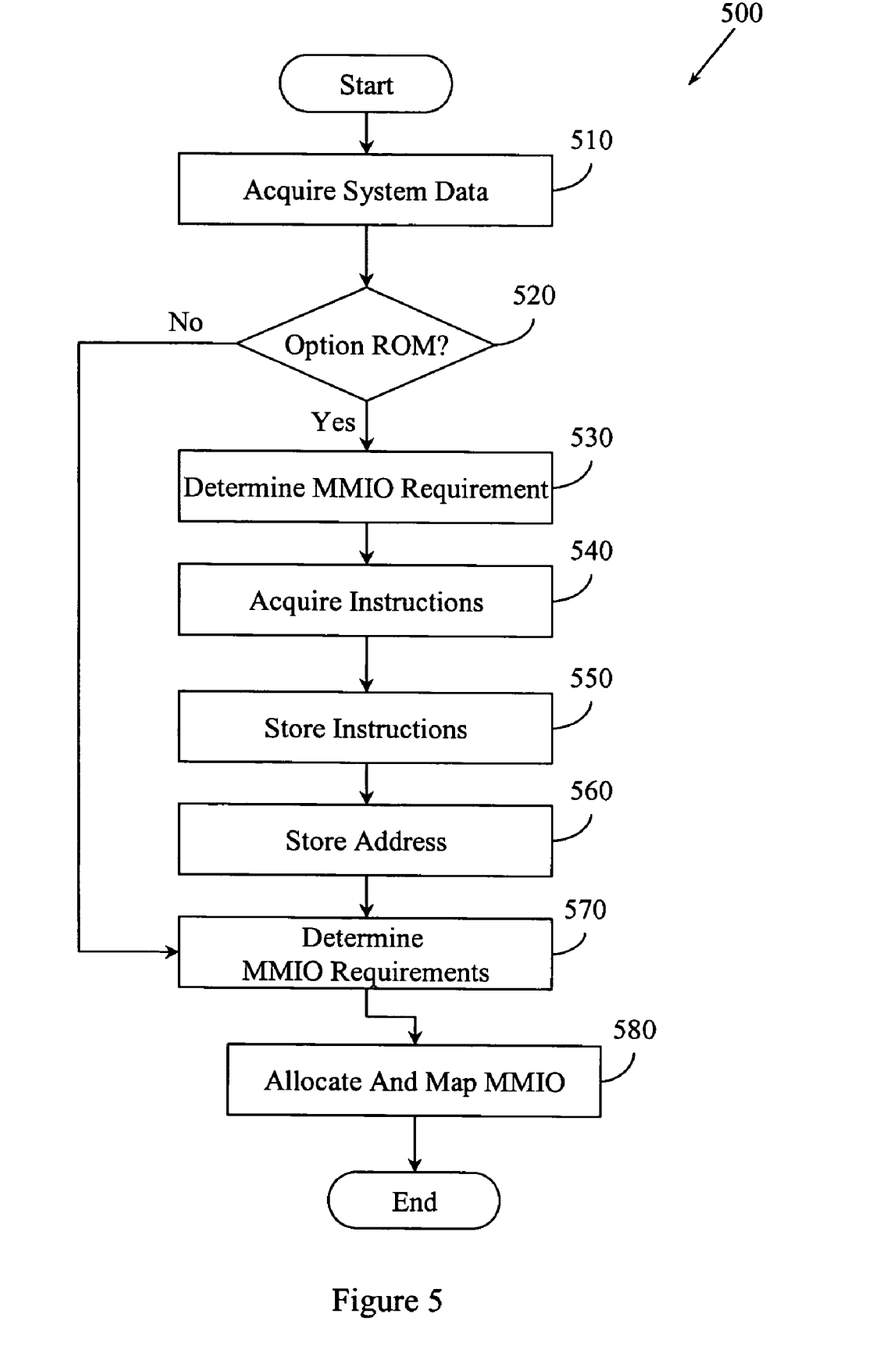
FIG. 5 illustrates an example method for acquiring a device driver from an option ROM, for storing the device driver in non-MMIO memory, and for selectively allocating MMIO memory based on information gathered while acquiring device drivers from option ROMs.

Example methods may be better appreciated with reference to the flow diagrams of FIGS. 3 through 5. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks. In the flow diagrams, blocks denote "processing blocks" that may be implemented with logic. The processing blocks may represent a method step and/or an apparatus element for performing the method step.

FIG. 3 illustrates an example method 300 that is configured to facilitate, for example, acquiring a device driver from an option ROM and storing the device driver in non-MMIO memory. Thus, method 300 may include, at 305, determining how much memory mapped input/output (MMIO) memory is available to a computer. Some conventional systems may have as little as 64 Kb of MMIO memory available. Therefore, MMIO memory is a precious resource and example methods described herein may facilitate intelligently partitioning, allocating, and mapping MMIO memory to facilitate communicating with a large number of I/O devices without exhausting the available MMIO memory.

Method 300 may also include, at 310, accessing a data store that is configured to store information concerning devices operably connected to the computer. The devices may be directly connected to the computer through, for example, a primary PCI bus. The devices may also be indirectly connected to the computer, through, for example, a secondary PCI bus made available through, for example, a PCI-to-PCI (P2P) bridge. While a primary PCI bus and secondary PCI busses are described, it is to be appreciated that various I/O devices may be operably connected to the computer through a variety and number of connection methods (e.g., bus, connection fabric, network). Furthermore, it is to be appreciated that other architectures like cellular architectures may employ example methods like method 300.

Method 300 may also include, at 315, searching for devices operably connected to the computer. Searching for devices may be performed, for example, as part of a boot sequence. At 320, a determination may be made concerning whether a device has been discovered to be operably connected to the computer. Upon discovering that a device is operably connected to the computer, method 300 may include, at 325, logically representing the device in the data store. Logically representing the discovered device in the data store may include, for example, adding a leaf to a tree data structure, updating a node in a directed graph data structure, and the like. In one example, the data structure may be dynamically built during the discovery process. While a tree structure and a directed graph are described, it is to be appreciated that a discovered device may be logically represented in a variety of methods in a variety of data structures. Thus, logically representing a discovered device may include storing data values that facilitate locating, identifying and/or interacting with a device.

Having found a device, method 300 may also include, at 330, determining an MMIO memory requirement for the device. In one example, a device may store, in an option ROM, data concerning a preferred amount of MMIO to be allocated for the device. Thus, in one example, determining an MMIO memory requirement may include reading that stored value. However, a device may request an amount of MMIO different from what method 300 determines to be an appropriate amount. By way of illustration, an option ROM may store a value that assumes that a device driver in the option ROM will be stored and executed from MMIO memory. However, example methods described herein facilitate storing device drivers from option ROMs in non-MMIO memory. Therefore, requested MMIO size and allocated MMIO size may differ.

At 335, a determination may be made concerning whether a discovered I/O device includes an option ROM. Upon determining that the device includes an option ROM, method 300 may, at 340, map the option ROM into the computer MMIO space. For example a base address register and an offset associated with the option ROM may be made available to the processor. Having mapped the option ROM, method 300 may then proceed, at 345, to open an MMIO aperture for the discovered I/O device. Opening the aperture may facilitate communicating with the discovered I/O device and/or other I/O devices that operably connect to the processor through the discovered device. In a system with a large number of I/O devices organized into several hierarchical layers, many I/O devices may need to communicate through an opened MMIO aperture. Thus, in one example, the MMIO aperture may be opened to a maximum available size.

After opening the MMIO aperture, at 350, a device driver for the discovered device may be read from the option ROM. While reading a device driver is described, it is to be appreciated that in one example the device driver may be pushed to method 300, and thus the action at 350 may include receiving a device driver. Having read the device driver, method 300 may, at 355, store the device driver in non-MMIO memory available to the computer. Note that the device driver is not stored in MMIO memory as is typical in conventional systems. Thus, MMIO memory may be preserved and/or more intelligently allocated as illustrated in FIG. 4.

Method 300 may also include, at 360, unmapping the option ROM from the computer and, at 365, linking the device driver stored in the non-MMIO memory to a device(s) logically represented in the data store. The device driver stored in non-MMIO memory may be linked to a device for which there is an entry in the data structure in the data store by, for example, adding a field to a record, updating a pointer in a leaf in a tree structure, and so on. Additionally, in one example, a device driver stored in non-MMIO memory may be linked to devices other than the device from whose option ROM the device driver was acquired. For example, a first SCSI card may not have included an option ROM with a device driver. Thus, a default device driver may be used to communicate with the SCSI card. However, a second SCSI card may have included an option ROM with a device driver. Furthermore, the device driver may have included bug fixes making the device driver superior to the default device driver employed with the first SCSI card. Therefore, in one example, method 300 facilitates linking the device driver read from the second SCSI card to both the first and second SCSI cards.

Having discovered devices, selectively acquired device drivers from option ROMs, and so on, method 300 may conclude, at 370, by closing MMIO apertures for devices for which MMIO apertures were opened. Thus, after method 300 has executed, system discovery may be complete, information concerning I/O devices operably connected to a computer may be available, and device drivers for those I/O devices may be available in non-MMIO memory. Thus, method 400, illustrated in FIG. 4, may selectively partition, allocate, and map MMIO to the discovered devices as described below. In one example, method 300 and method 400 may be linked together to form a single method.

Method 300 may be performed by a system that allows hot-swapping of I/O devices. Thus, in one example, method 300 may include identifying a slot (e.g., PCI slot) where another device could be operably connected to the computer. The slot may be, for example, associated with a primary bus in the computer or with a secondary bus made available across a PCI to PCI bridge. Again, while PCI slots are described it is to be appreciated that other slots (e.g., physical locations with which I/O devices can be associated) may be employed.

Upon identifying the slot, method 300 may include reserving a pre-determined amount of MMIO-memory for the slot. Therefore, the slot may be considered during partitioning, allocation, and mapping of MMIO memory to discovered devices and locations where devices may appear. Thus, method 300 may continue executing after partitioning, allocating, and mapping MMIO memory available to the computer to devices and/or slots logically represented in the data store has been performed. For example, upon determining that an additional device that includes an option ROM has been associated with a previously identified slot, method 300 may include logically representing the additional device in the data store. For example, another leaf may be added to a tree, another node may be added to a directed graph, and so on.

Having discovered the additional device now residing in the previously identified slot, method 300 may include opening an MMIO aperture for the device. Since MMIO memory has already been allocated to previously discovered devices, in one example, the MMIO aperture size may be limited to a size that is less than or equal to the amount of MMIO memory previously reserved for the slot. Thus the addition of a new device may not require repeating the boot process discovery procedure.

Method 300 may also include reading a device driver for the additional device from the option ROM on the additional device, storing the device driver for the additional device in non-MMIO memory, closing the MMIO aperture for the additional device and linking the device driver for the additional device stored in non-MMIO memory to one or more devices logically represented in the data store.

In some examples, hot-swapping may include replacing a previously discovered I/O device with a later-added I/O device. Thus, in one example, method 300 may include determining that a first device that is logically represented in the data store has been replaced by a second device and that the second device includes an option ROM. Upon making the determination, method 300 may include opening an MMIO aperture for the second device, where the MMIO aperture size is less than or equal to the amount of MMIO memory previously allocated to the first device. Thus the second device may be constrained to an MMIO aperture size different from what it may desire because MMIO memory may have already been partitioned, allocated, and mapped to previously discovered devices.

Method 300 may also include reading a device driver for the second device from the option ROM on the second device, storing the device driver for the second device in non-MMIO memory, closing the MMIO aperture for the second device and then linking the device driver for the second device stored in non-MMIO memory to one or more devices logically represented in the data store. Thus, a device driver retrieved from an option ROM associated with a later-added I/O device may become available to earlier discovered I/O devices.

While FIG. 3 illustrates various actions occurring in serial, it is to be appreciated that various actions illustrated in FIG. 3 could occur substantially in parallel. By way of illustration, a first process could manage the data store in which a device hierarchy is maintained. Similarly, a second process could discover devices, while a third process could acquire and link device drivers provided by discovered I/O devices. While three processes are described, it is to be appreciated that a greater and/or lesser number of processes could be employed and that lightweight processes, regular processes, threads, and other approaches could be employed. It is to be appreciated that other example methods may, in some cases, also include actions that occur substantially in parallel.

In one example, methodologies are implemented as processor executable instructions and/or operations provided on a computer-readable medium. Thus, in one example, a computer-readable medium may store processor executable instructions operable to perform a method that includes determining an amount of MMIO memory available to a computer and accessing a data store configured to store information concerning devices operably connected to the computer. The method may also include searching for devices operably connected to the computer and, upon discovering a device that is operably connected to the computer, performing several actions. The actions may include, for example, logically representing the device in the data store, determining an MMIO memory requirement for the device and determining whether the device includes an option ROM. If the device includes an option ROM, the method may include mapping the option ROM into the computer, opening an MMIO aperture for the device, reading a device driver for the device from the option ROM, storing the device driver in non-MMIO memory available to the computer, unmapping the option ROM from the computer, and linking the device driver stored in the non-MMIO memory to a device logically represented in the data store. After acquiring the device drivers, the method may include, for devices for which an MMIO aperture was opened, closing the MMIO aperture.

While the above method is described being provided on a computer-readable medium, it is to be appreciated that other example methods described herein can also be provided on a computer-readable medium.

FIG. 4 illustrates a method 400 associated with acquiring a device driver from an option ROM, storing the device driver in non-MMIO memory, and intelligently allocating MMIO memory. As described above, method 400 may be performed, for example, after method 300 (FIG. 3) or after other similar methods have acquired and stored device drivers in non-MMIO memory. Alternatively, in one example, method 400 may include, at 410, acquiring device drivers from option ROMs on discovered I/O devices and storing the device drivers in non-MMIO memory.

Method 400 may include, at 420, determining a total amount of MMIO memory required by devices logically represented in a data store that stores information concerning discovered devices that are operably connected to a computer and functioning as a part of the computer. Determining the total amount of MMIO memory may include, for example, examining leaf nodes in a tree structure to locate individual I/O device requirements and summing those requirements.

Method 400 may also include, at 430, selectively partitioning MMIO memory available to the computer based, at least in part, on the total amount of MMIO memory required by the devices logically represented in the data store and/or an individual amount of MMIO memory required by individual devices logically represented in the data store. For example, after system discovery, one thousand and one I/O devices may have been discovered. One thousand of the I/O devices may have a total MMIO memory requirement of 100 Kb with an average requirement of 1 Kb. Additionally, one individual I/O device may have an MMIO memory requirement of 8 Kb of memory. Thus, in different examples, MMIO may be partitioned to account for the overall requirements of the set of discovered I/O devices and/or the individual requirements of individual I/O devices.

Method 400 may, at 440, include selectively allocating a portion of the MMIO memory available to the computer to a device logically represented in the data store, and, at 450, include selectively mapping the portion of the MMIO memory to the device logically represented in the data store.

FIG. 5 illustrates a method 500 for acquiring a device driver from an option ROM, for storing the device driver in non-MMIO memory, and for selectively allocating MMIO memory based on information gathered while acquiring device drivers from option ROMs. Method 500 may include, at 510, selectively acquiring system data concerning components in a hierarchy of components operably connected to a processor. The hierarchy of components may be discovered, for example, during a discovery process associated with a boot procedure. The system data may include, for example, a component identifier, a component option ROM identifier, a component option ROM size, a component maximum MMIO aperture size, a component MMIO size requirement, and so on. Thus, the system data may facilitate identifying, locating, and/or interacting with a device.

Method 500 may also include, at 520, determining whether a discovered component included an option ROM. For components with an option ROM for which system data is acquired, method 500 may include, at 530, determining an MMIO memory requirement for the component. Determining the MMIO memory requirement may include, for example, reading a value from the option ROM, examining a field in the system data, and so on. Method 500 may also include, at 540, selectively acquiring processor executable instructions from the option ROM. The processor executable instructions may be, for example, a device driver for the I/O device, initialization code for the I/O device, and so on. Acquiring the instructions may include, for example, reading the instructions and/or receiving the instructions.

Having acquired the processor executable instructions, method 500 may proceed, at 550, to store the processor executable instructions in non-MMIO memory available to the processor. Thus device drivers acquired from option ROMs associated with I/O devices are not stored in MMIO memory as is typical in conventional systems. With the instructions available in non-MMIO memory, method 500 may then, at 560, make the instructions available to the processor, other I/O devices, and so on, by storing the location of the processor executable instructions stored in non-MMIO memory in a memory location available to the processor. In one example, the location (e.g., address) may be stored with the system data.

With system discovery complete and option ROM device drivers collected and made available, method 500 may then proceed, at 570, to determine a total amount of MMIO memory required by components for which system data was acquired. With the total requirements available, and with self-knowledge about system capacities (e.g., available MMIO memory), method 500 may then, at 580, selectively allocate and map MMIO memory available to the processor to components for which system data was acquired.

In one example, allocating and mapping MMIO memory at 580 may include determining whether the processor has enough MMIO memory to satisfy the MMIO memory requirements of the components for which system data was acquired. If the processor has enough MMIO memory available, then the actions at 580 may include, for example, allocating a portion of the MMIO memory available to the processor sufficient to satisfy the MMIO memory requirement for a selected component for which system data was acquired and mapping the portion to the selected component.

Figure 6:
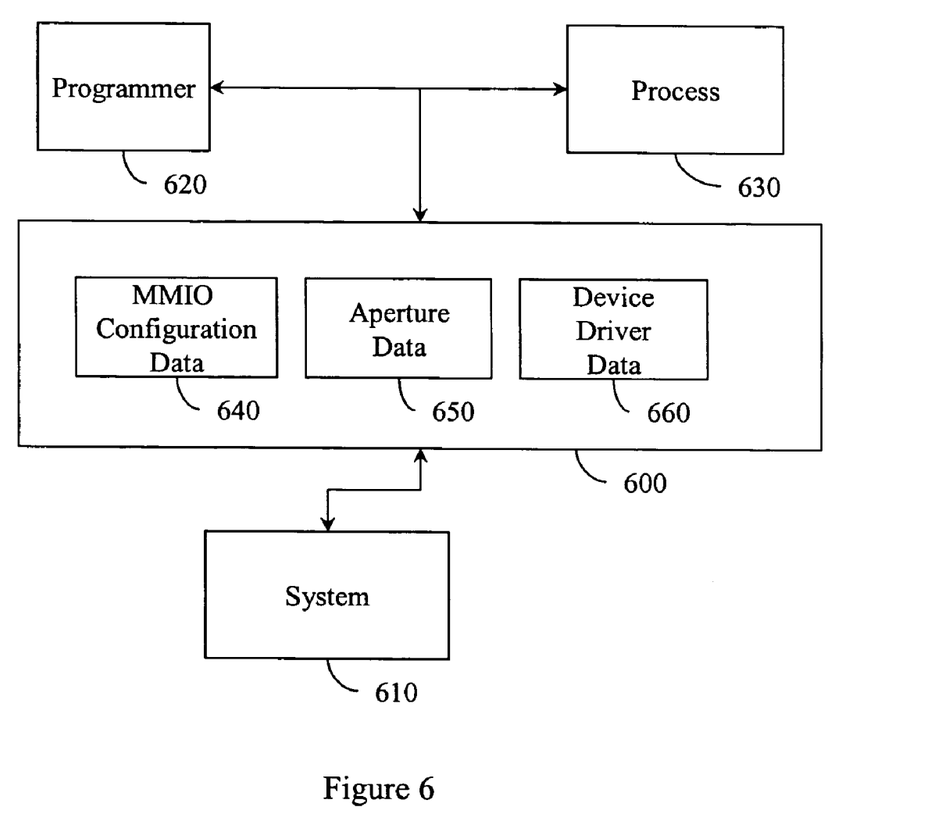
FIG. 6 illustrates an example application programming interface (API) for accessing a system for acquiring a device driver from an option ROM and storing the device driver in non-MMIO memory.

Referring now to FIG. 6, an application programming interface (API) 600 is illustrated providing access to a system 610 for acquiring a device driver from an option ROM and storing the device driver in non-MMIO memory. The API 600 can be employed, for example, by a programmer 620 and/or a process 630 to gain access to processing performed by the system 610. For example, a programmer 620 can write a program to access the system 610 (e.g., invoke its operation, monitor its operation, control its operation) where writing the program is facilitated by the presence of the API 600. Rather than programmer 620 having to understand the internals of the system 610, the programmer 620 merely has to learn the interface to the system 610. This facilitates encapsulating the functionality of the system 610 while exposing that functionality.

Similarly, the API 600 can be employed to provide data values to the system 610 and/or retrieve data values from the system 610. For example, a process 630 that allocates MMIO memory can provide MMIO configuration data to the system 610 via the API 600 by, for example, using a call provided in the API 600. Thus, in one example of the API 600, a set of application programming interfaces can be stored on a computer-readable medium. The interfaces can be employed by a programmer, computer component, logic, and so on, to gain access to a system 610 for acquiring a device driver from an option ROM and storing the device driver in non-MMIO memory. The interfaces can include, but are not limited to, a first interface 640 that communicates an MMIO configuration data, a second interface 650 that communicates an aperture data, and a third interface 660 that communicates a device driver data. The MMIO configuration data may identify, for example, the type, amount, availability, and so on, of MMIO memory available to a system for which device drivers are being acquired. The aperture data may identify, for example, the size of an MMIO aperture associated with a discovered device from which a device driver will be read from an option ROM. The device driver data may include, for example, processor executable instructions read from the option ROM on a discovered device.

Figure 7:
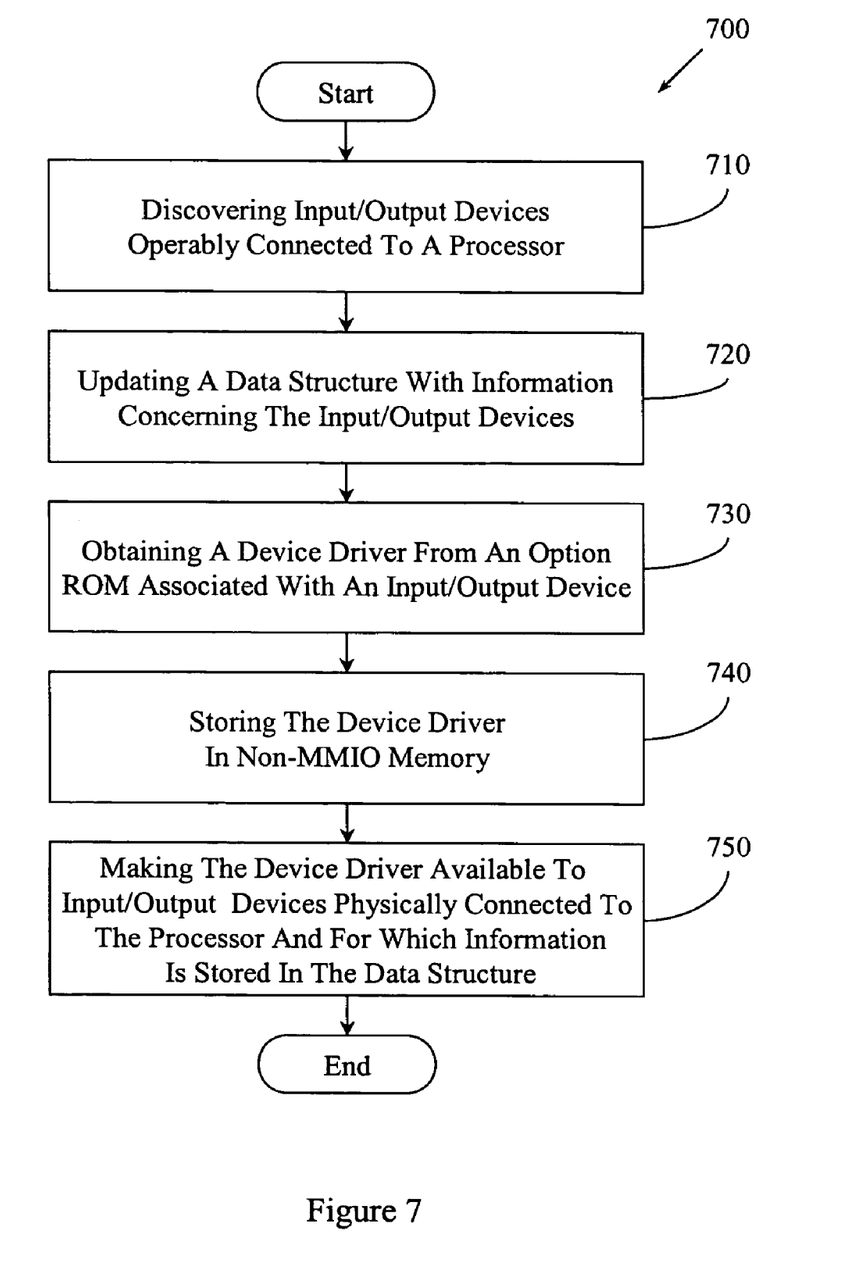
FIG. 7 illustrates one embodiment of a method for obtaining a device driver from an option ROM.

FIG. 7 illustrates an example method 700 for obtaining a device driver from an option ROM. The method 700 may include, at 710, discovering input/output devices operably connected to a processor. The method 700 may then, at 720, update a data structure with information concerning the input/output devices. The method 700 may include, at 730, obtaining a device driver from an option ROM associated with an input/output device, and, at 740, storing the device driver in non-MMIO memory. The method 700 may then include, at 750, making the device driver available to input/output devices physically connected to the processor and for which information is stored in the data structure.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A method, comprising:
   determining an amount of a memory mapped input/output (MMIO) memory available to a computer;

accessing a data store configured to store information concerning devices operably connected to the computer;
searching for devices operably connected to the computer;
upon discovering a device that is operably connected to the computer:
  logically representing the device in the data store;
  determining an MMIO memory requirement for the device; and
  upon determining that the device includes an option ROM:
    mapping the option ROM into the computer;
    opening an MMIO aperture for the device;
    reading a device driver for the device from the option ROM;
    storing the device driver in a non-MMIO memory available to the computer;
    unmapping the option ROM from the computer; and
    linking the device driver stored in the non-MMIO memory to one or more devices logically represented in the data store;
  and
for devices for which MMIO apertures were opened, closing the MMIO apertures.

2. The method of claim 1, including:
determining a total amount of MMIO memory required by the one or more devices logically represented in the data store;
selectively partitioning the MMIO memory available to the computer based, at least in part, on the total amount of MMIO memory required by the one or more devices logically represented in the data store and an individual amount of MMIO memory required by individual devices logically represented in the data store;
selectively allocating a portion of the MMIO memory available to the computer to a device logically represented in the data store; and
selectively mapping the portion of the MMIO memory to the device logically represented in the data store.

3. The method of claim 1, the data store being configured to store, in a hierarchical representation, information concerning devices operably connected to the computer.

4. The method of claim 3, the hierarchical representation comprising a tree.

5. The method of claim 1, including opening the MMIO aperture to a maximum size.

6. The method of claim 1, where linking the device driver stored in the non-MMIO memory to one or more devices logically represented in the data store includes establishing, in the data store, a pointer to the device driver stored in the non-MMIO memory.

7. The method of claim 1, including:
identifying a slot where another device could be operably connected to the computer;
upon identifying the slot, reserving a pre-determined amount of MMIO-memory for the slot; and
after partitioning, allocating, and mapping the MMIO memory available to the computer to the one or more devices logically represented in the data store, upon determining that an additional device that includes an option ROM has been associated with the slot;
logically representing the additional device in the data store;
opening an additional MMIO aperture for the additional device, where the additional MMIO aperture size is less than or equal to the pre-determined amount of MMIO memory previously reserved for the slot;
reading an additional device driver for the additional device from the option ROM on the additional device;
storing the additional device driver for the additional device in the non-MMIO memory;
closing the additional MMIO aperture for the additional device; and
linking the additional device driver stored in the non-MMIO memory for the additional device to one or more devices logically represented in the data store.

8. The method of claim 1, including:
after partitioning, allocating, and mapping the MMIO memory available to the computer to the one or more devices logically represented in the data store, upon determining that a first device that is logically represented in the data store has been replaced by a second device and that the second device includes an option ROM:
logically representing the second device in the data store;
opening an MMIO aperture for the second device, where the MMIO aperture size for the second device is less than or equal to the amount of MMIO memory previously allocated to the first device;
reading a device driver for the second device from the option ROM on the second device;
storing the device driver for the second device in the non-MMIO memory;
closing the MMIO aperture for the second device; and
linking the device driver stored in the non-MMIO memory for the second device to one or more devices logically represented in the data store.

9. A method, comprising:
determining an amount of a memory mapped input/output (MMIO) memory available to a computer with a cellular architecture;
accessing a data store configured to store, in a tree data structure, information concerning I/O devices operably connected to the computer;
searching for I/O devices operably connected to the computer;
upon discovering an I/O device that is operably connected to the computer:
  logically representing the I/O device in the tree data structure;
  determining an MMIO memory requirement for the I/O device by examining a data value stored on the I/O device; and
  upon determining that the I/O device includes an option ROM:
    mapping the option ROM into the computer;
    opening an MMIO aperture for the I/O device to a maximum possible size;
    reading a device driver for the I/O device from the option ROM;
    storing the device driver in non-MMIO memory available to the computer;
    unmapping the option ROM from the computer; and
    linking the device driver stored in the non-MMIO memory to an I/O device logically represented in the tree data structure;
for I/O devices for which MMIO apertures were opened, closing the MMIO apertures;
determining a total amount of MMIO memory required by I/O devices logically represented in the tree data structure;
selectively partitioning the MMIO memory available to the computer based, at least in part, on the total amount of MMIO memory required by the I/O devices logically represented in the tree data structure;

selectively allocating a portion of the MMIO memory available to the computer to an I/O device logically represented in the tree data structure; and selectively mapping the portion of the MMIO memory to the I/O device logically represented in the tree data structure.

10. A computer-readable medium storing processor executable instructions operable to perform a method, the method comprising:

determining an amount of a memory mapped input/output (MMIO) memory available to a computer;

accessing a data store configured to store information concerning devices operably connected to the computer;

searching for devices operably connected to the computer;

upon discovering a device that is operably connected to the computer:

logically representing the device in the data store;

determining an MMIO memory requirement for the device; and upon determining that the device includes an option ROM:

mapping the option ROM into the computer;

opening an MMIO aperture for the device;

reading a device driver for the device from the option ROM;

storing the device driver in non-MMIO memory available to the Computer;

unmapping the option ROM from the computer; and linking the device driver stored in the non-MMIO memory to one or more devices logically represented in the data store; and for devices for which MMIO apertures were opened, closing the MMIO apertures.

11. A method, comprising: selectively acquiring system data concerning one or mow components in a hierarchy of components operably connected to a processor; for a component for which system data is acquired, where the component includes an option ROM:

determining an MMIO memory requirement for the component;

selectively acquiring a processor executable instruction from the option ROM;

storing the processor executable instruction in non-MMIO memory available to the processor; and storing the location of the processor executable instruction in non-MMIO memory in a memory location available to the processor;

determining a total amount of MMIO memory required by components for which system data was acquired; and allocating and mapping MMIO memory available to the processor to components for which system data was acquired.

12. The method of claim 11, where system data concerning a component includes one or more of, a component identifier, a component option ROM identifier, a component option ROM size, a component maximum MMIO aperture size, and a component MMIO size requirement.

13. The method of claim 11, where determining an MMIO memory requirement for the component includes retrieving a data value from the component.

14. The method of claim 11, where selectively acquiring the processor executable instruction from the option ROM includes reading from the option ROM.

15. The method of claim 11, where allocating and mapping MMIO memory available to the processor to components for which system data was acquired includes:

upon determining that the processor has enough MMIO memory to satisfy the MMIO memory requirements of the components for which system data was acquired:

allocating a portion of the MMIO memory available to the processor, where the portion of the MMIO memory is sufficient to satisfy the MMIO memory requirement for a selected component for which system data was acquired; and mapping the portion to the selected component.

16. A system, comprising:

a device discovery logic configured to discover a device operably connected to a processor having available a finite amount of memory mapped input/output (MMIO) memory for interacting with the device, the processor also having available a finite amount of non-MMIO memory;

an option ROM logic configured to read a processor executable instruction from an option ROM associated with a device discovered by the device discovery logic and to store the processor executable instruction in the non-MMIO memory; and an MMIO allocation logic operably connected to the processor, the MMIO allocation logic being configured to determine an MMIO memory requirement for devices discovered by the device discovery logic and to selectively allocate MMIO memory to the devices.

17. The system of claim 16, the device comprising an input/output device.

18. The system of claim 16, the processor being an element of a computing system organized in a cellular architecture.

19. The system of claim 16, the processor executable instruction comprising a portion of a device driver configured to facilitate an interaction between the device end the processor.

20. The system of claim 16, the device discovery logic being configured to manipulate a system tree to record data concerning devices discovered by the device discovery logic and to programmatically link the processor executable instruction stored in the non-MMIO memory to one or more devices for which data is recorded in a system tree.

21. The system of claim 20, the device discovery logic being Configured;

to identify an unused physical location where a device could be operably connected to the processor and to reserve a pre-determined amount of MMIO-memory for the unused physical location;

after allocating MMIO memory to one or more devices, to determine that a newly discovered device that includes an option ROM has occupied the unused physical location;

to update the system tree with data concerning the newly discovered device;

to acquire a device driver from the newly discovered device and to store the device driver in non-MMIO memory; and to make the device driver from the newly discovered device stored in non-MMIO memory available to one or more devices for which data is recorded in the system tree.

22. The system of claim 20, the device discovery logic being configured:

to determine that a first device for which data is recorded in the system tree has been replaced, after allocating MMIO memory to the first device, with a second device that includes an option ROM:

to open an MMIO aperture, where the MMIO aperture size is less than or equal to an amount of MMIO memory previously allocated to the first device;

to read a device driver for the second device from the option ROM on the second device;

to store the device driver for the second device in non-MMIO memory;

to close the MMIO aperture; and to link the device driver for the second device stored in non-MMIO memory to one or more devices for which data is recorded in the system tree.

23. A set of application programming interfaces embodied on a computer-readable medium for execution by a processor in conjunction with acquiring a device driver from an option ROM and storing the device driver in non-MMIO memory, comprising:

a first interface for communicating an MMIO configuration data;

a second interface for communicating an aperture data; and a third interface for communicating a device driver data, where the MMIO configuration data identifies one of, a type, an amount, and an availability, of MMIO memory available to a system for which device drivers are being acquired;

the aperture data identifies a size of an aperture associated with a discovered device from which a device driver will be read from an option ROM; and the device driver data includes a processor executable instruction read from an option ROM on a discovered device.

24. A method, comprising:

discovering input/output devices operably connected to a processor;

updating a data structure with information concerning the input/output devices;

obtaining a device driver from an option ROM associated with an input/output device;

storing the device driver in non-MMIO memory; and making the device driver available to input/output devices physically connected to the processor and for which information is stored in the data structure.

* * * * *

UNITED STATES PATENT AND TRADEMARK OFFICE
CERTIFICATE OF CORRECTION

PATENT NO. : 7,539,832 B2 Page 1 of 1
APPLICATION NO. : 10/923905
DATED : May 26, 2009
INVENTOR(S) : Stephen Silva et al.

It is certified that error appears in the above-identified patent and that said Letters Patent is hereby corrected as shown below:

In column 15, line 29, in Claim 10, delete "Computer" and insert -- computer --, therefor.

In column 15, line 37, in Claim 11, delete "mow" and insert -- more --, therefor.

In column 16, line 36, in Claim 19, delete "end" and insert -- and --, therefor.

In column 16, line 45, in Claim 21, delete "Configured;" and insert -- configured: --, therefor.

Signed and Sealed this

Fifteenth Day of September, 2009

David J. Kappos
*Director of the United States Patent and Trademark Office*